United States Patent [19]

Gerritsen

[11] Patent Number: 4,850,682

[45] Date of Patent: Jul. 25, 1989

[54] DIFFRACTION GRATING STRUCTURES

[75] Inventor: Hendrik J. Gerritsen, Providence, R.I.

[73] Assignee: Advanced Environmental Research Group, Cambridge, Mass.

[21] Appl. No.: 885,243

[22] Filed: Jul. 14, 1986

[51] Int. Cl.[4] ................................................ G02F 1/13
[52] U.S. Cl. ................................ 350/348; 350/347 R; 350/347 V; 350/347 E; 350/162.2
[58] Field of Search ................. 350/347 V, 348, 162.2, 350/162.22, 162.17, 347 R, 347 E, 331 R

[56] References Cited

U.S. PATENT DOCUMENTS

| | | | |
|---|---|---|---|
| 3,698,795 | 10/1972 | Flint | 350/162.22 |
| 3,843,231 | 10/1974 | Borel et al. | 350/348 |
| 3,856,381 | 12/1974 | Hedman, Jr. et al. | 350/348 |
| 3,980,403 | 9/1976 | Pollack | 350/348 |
| 4,011,009 | 3/1977 | Lama et al. | 350/162.22 |
| 4,045,124 | 8/1977 | Pollack et al. | 350/348 |
| 4,729,640 | 3/1988 | Sakata | 350/347 V |

FOREIGN PATENT DOCUMENTS 2136761  2/1973  Fed. Rep. of Germany ...... 350/348
2173605 10/1986  United Kingdom ........... 350/162.17

Primary Examiner—Stanley D. Miller
Assistant Examiner—Trong Quang Phan
Attorney, Agent, or Firm—Robert F. O'Connell

[57] ABSTRACT

A diffraction grating responds to incoming radiation incident thereon within a given range of incidence angles and re-directs such incident radiation from the structure in a selected direction within relatively limited confines. A liquid crystal material is positioned in contact with the diffracting surface of said at least one diffraction structure, the liquid crystal material, when inactivated, having a refractive index substantially the same as that of the diffraction structure. Activation means place the liquid crystal material in an activated state so that the refractive index thereof is substantially different from that of the diffraction structure whereby incoming radiation within a given range of incidence angles is transmitted through the structure and exits in the selected direction.

17 Claims, 2 Drawing Sheets

DIFFRACTION GRATING STRUCTURES

This invention relates generally to diffraction grating structures and, more particularly, to such structures which are capable of responding to incoming radiation within a wide range of wavelengths incident thereon from directions over a wide range of incidence angles and of handling such radiation in a specified manner such as by directing the incident radiation in substantially the same general direction, i.e., within relatively limited confines independent of the incident angle and the wavelength within such ranges.

BACKGROUND OF THE INVENTION

Certain light transmitting structures have been proposed for use in responding to input incident radiation and in redirecting such radiation toward a generally defined and relatively confined region. For example, holographic window structures have been proposed for responding to sunlight radiation and for redirecting such radiation in a selected direction toward a desired interior region of a room for illumination thereof. One of the problems with such structures has been that, as the angle of incidence of the incoming sunlight radiation changes, either in azimuth or elevation, or both, the direction of the redirected illuminating radiation changes within the room. It is desirable to provide a window structure which would experience only small changes in the redirected light, even though the angle of incidence of the incoming radiation changes over a relatively wide range.

The use of holograms for such purpose has been suggested, both in the form of structures known to those in the art as "thin" holograms and "volume" holograms. While thin holograms tend to accept and respond to incoming radiation over a relatively wide range of incidence angles, it has been found that, as the angle of incidence changes, the direction of the output radiation changes markedly. In addition thin holograms do not have as high an efficiency as volume holograms, that is, a considerable fraction of the incident light (of the order of 50% typically) continues undiffracted through the hologram. On the other hand, while volume holograms tend to diffract incident incoming radiation so that it remains within relatively limited confines and with high efficiency, the hologram responds to incoming radiation only over a relatively narrow range of incidence angles.

It has been further suggested that, in order to overcome the above problems, a diffracting structure be used which is formed by utilizing a plurality of layers, or laminations, of structural elements each having diffraction characteristics selected so as to control the radiation transmitted through the structure in a selected manner. Such a concept is disclosed, for example, in the copending U.S. patent application, Ser. No. 738,300, filed on May 28, 1985 by Hendrik J. Gerritsen et al.

A typical three-layer embodiment as disclosed therein includes two outer diffracting elements each having, for example, a selected topographical diffraction relief pattern formed on at least one surface thereof, and an intermediate element having a selected topographical diffraction relief pattern formed on at least one surface thereof positioned between them. The intermediate element has an index of refraction which is selected to be significantly different from the index of refraction of either of the two outer structural elements.

The use of a plurality of such layered, or laminated, embodiments in an overall structure is found to respond to incoming radiation over a relatively wide range of input incidence angles and over a relatively wide band of wavelengths and, when used as a window structure, directs such radiation toward a selected region which remains within relatively limited confines for all visible wavelengths.

However, while such structures are satisfactory in many applications, it is found that the range of output angles over which the desired operation can be achieved may not be narrow enough in some applications, i.e., as the range of incidence angles increases, the region to which the exiting radiation can be confined also increases. Hence, a trade off must be made between the range of incident angles to which the structure can respond and the range of exit angles that results, i.e., the wider the range of incident angles of acceptance the wider the range of exit angles. Moreover, as the number of layers of material needed to achieve a wider range of incidence angles is increased, the more complex the structure becomes and the more difficult it is to fabricate. Furthermore, reflections of the incident and the diffracted radiation occur at the interfaces between layers of different refractive indices reducing the efficiency.

BRIEF SUMMARY OF THE INVENTION

This invention utilizes an improved structure which, although based on similar general principles of operation as discussed in the aforesaid Gerritsen et al. application, permits the structure to respond to incoming radiation over a wide range of incident angles while maintaining a narrow range of exit angles and without undue reflections of the transmitted radiation energy through the structure.

In accordance with the invention, the structure thereof comprises at least a pair of oppositely disposed surfaces, one of which includes a diffraction grating surface, which form an intermediate region therebetween. A liquid crystal material is contained within the intermediate region. When the liquid crystal is inactive, i.e., no electric field is applied across the material, incident radiation is transmitted through said two surfaces and liquid crystal material with little or no change in its direction and little or no reflection thereof, as if the structure were, in effect, a planar plate of glass. However, when an electric field is applied across the liquid crystal material, the refractive index of the liquid crystal material becomes substantially different from that of the material forming the diffraction grating surface and incoming radiation over a selected range of incident angles is redirected through the structure and exits therefrom in a selected direction which is within relatively confined limits. When so activated, the structure responds to incident radiation over a range of incidence angles which is determined by the topographical relief structure which forms the diffraction surface.

In order to provide for the diffraction of incident radiation in a relatively narrow range of exit angles, for a wide range of incident angles, a plurality of pairs of such oppositely disposed surfaces can be used, each pair having liquid crystal material contained therebetween. Each pair when activated responds to incident radiation over a different range of incident angles but diffracts this radiation in the same narrowly confined range of exit angles as all the pairs in the plurality, when activated. The liquid crystal materials within each pair of surfaces can then be activated appropriately, i.e., an electric field is applied across the material, at any one time when the incoming radiation lies within the range of angles associated with that pair. At such time the liquid crystal materials in all other such pairs remain in an inactivated state and incoming radiation is transmitted therethrough with substantially no change in direction (such other pairs appear in effect to be non-existent to the incoming radiation, as mentioned above). Thus, as each pair is separately activated, incoming incident radiation over a large range of incidence angles can be accommodated, such radiation always being transmitted through the overall structure and redirected so as to exit therefrom in substantially the same direction within substantially the same relatively limited confines. In addition, such a structure produces little or no reflection of the transmitted radiation so that the total energy which exits therefrom is not seriously diminished as the radiation is transmitted through the overall structure.

DESCRIPTION OF THE INVENTION

The invention can be described in more detail with the help of the accompanying drawings wherein FIGS. 1A and 1B show an embodiment of the invention used in two different modes of operation;

Figure 1A:
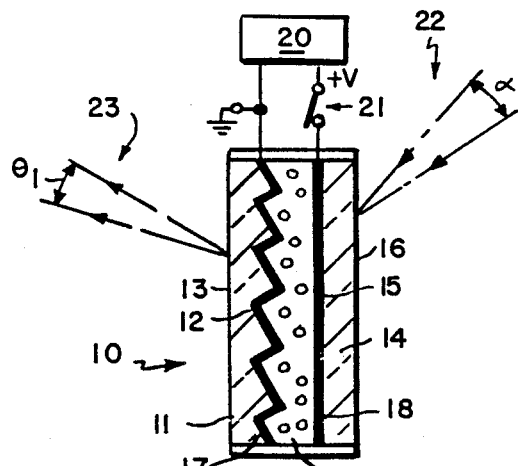
Figure 1B:
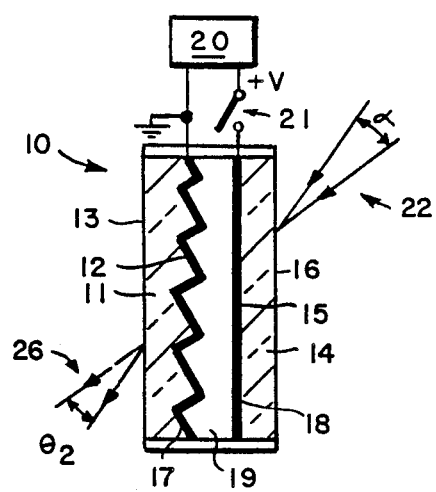

As can be seen in the particular embodiment of FIGS. 1A and 1B a transparent diffracting structure 10 can be formed as a first element 11 having a topographical relief pattern forming a diffraction grating surface 12 on one side thereof the other surface 13, for example, containing no relief pattern or diffraction grating surface. The element 11 may be made of a suitable transparent material, such as glass or transparent plastic. Such an element can be fabricated using known techniques wherein a master embossing or stamping element, for example, can be formed using known techniques. The master element has, for example, an inverse pattern of what is desired for the topographical relief pattern to be formed on each of a plurality of replicated elements. Such master element can then be used in an embossing technique, for example, for stamping out multiple replications of the desired topographical relief pattern on at least one surface of a plurality of elements such as elements 11. Such techniques for forming a master element and using holographic techniques for embossing diffracting surface replications thereof for such purpose have been described, for example, in U.S. Pat. No. 3,746,783, issued to H. J. Gerritsen et al. on July 17, 1973. Other techniques would be within the skill of the art to form such topographical relief pattern.

The particular dimensions and configuration of the relief pattern, e.g., the spacings between the raised portions of the grating, the heights thereof, and the angles thereof, are arranged, as would be well-known to the art, so as to respond in a desired manner to the wavelengths and directions of incoming radiation with which the elements are to be used (e.g., wavelengths in the visible part of the spectrum), and will depend on the application in which the overall device is used.

A second glass or transparent plastic element 14 having smooth non-diffracting surfaces 15 and 16 is positioned opposite the diffracting surface 12 of element 11 and is spaced therefrom so as to form an intermediate region therebetween. The opposite surfaces 12 and 15 of elements 11 and 14 are provided with thin coatings 17 and 18, respectively, of transparent electrically conductive materials, such as tin oxide or indium tin oxide. The intermediate region is filled with a nematic liquid crystal material 19 which comes into contact with each of the coated surfaces 17 and 18 of elements 11 and 14, respectively. Conductive coating 17 is connected for example to the grounded side of a source 20 of voltage (+V), while coating 18 can be connected to the positive side (+) of said voltage source via a switch 21. Appropriate end caps or covers are bonded to the upper and lower ends of elements 11 and 14 in order to contain the nematic liquid crystal material 19 within the intermediate region.

Both elements 11 and 14, as mentioned above, may be any suitable glass or transparent plastic material each having a known index of refraction, the indices of refraction of elements 11 and 14 being generally selected to be substantially the same. So long as no voltage is applied to conductive coating 18 (the switch 21 is open) there is no electric field applied across the liquid crystal material. In such state the liquid crystal is not aligned and its refractive index is substantially equal to that of elements 11 and 14. However, when the switch 21 is closed a voltage +V is applied across the liquid crystal material via conductive coatings 17 and 18 so that the liquid crystal material is aligned along the direction of the electrical field thereacross and a substantial change in the refractive index of the liquid crystal material occurs.

When the refractive index of liquid crystal material 19 is substantially different from that of elements 11 and 14 the overall structure responds to incoming radiation in a manner which is different from the response of the structure when no electric field is applied across the liquid crystal material. Such different modes of operation are depicted with reference to FIGS. 1A and 1B. In FIG. 1A the overall structure is activated (i.e., switch 21 is closed and voltage +V is applied across the liquid crystal material) and, because the refractive index of material 19 is substantially different from the refractive indices of elements 11 and 14, incoming radiation at surface 16 (depicted by arrows 22) over a range of incident angles depicted by "$\alpha$" is transmitted through the structure and is redirected substantially in the direction (within the range $\theta_1$) depicted by arrows 23 for all of the incoming radiation within the range $\alpha$ of incident angles. The range of exit angles $\theta_1$ is substantially the same as the range of incident angles.

However, as shown in FIG. 1B, when the structure is not activated (switch 21 is open and voltage +V is not applied across the liquid crystal material), the indices of refraction of the liquid crystal material and the elements 11 and 14 are substantially the same and the incoming radiation over the range of $\alpha$ is not so redirected and essentially is transmitted through the structure in an unchanged manner as shown by arrows 26. The range of exit angles $\alpha_2$ is approximately the same as that of the incident angle range $\alpha$.

It is found desirable to use nematic liquid crystal materials which have a relatively large anisotropy at room temperature. Thus, such materials have a sufficiently large difference in their refractive indices $n_{//}$ and $n_{\perp}$ along their parallel and perpendicular axes, respectively. For example, such materials should have a difference $(n_{//}-n_{\perp})$ which is greater than 0.10 and, preferably, which is equal to or greater than 0.20. One such material, for example, is a BDH-E7 nematic liquid crystal in which $(n_{//}-n_{\perp})$ is equal to about 0.20.

Figure 2:
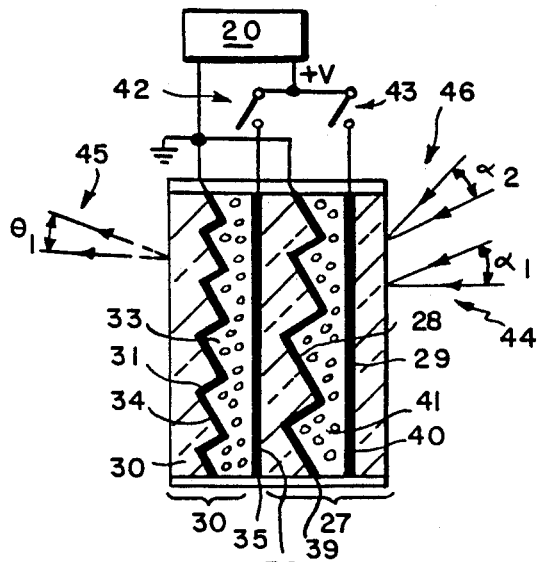
FIG. 2 shows an embodiment of the invention using a plurality of structures of the type shown in FIGS. 1A and 1B.

In order to extend the concept of FIGS. 1A and 1B a structure is provided to respond to radiation over a substantially wider range of incidence angles, while still re-directing such incoming radiation through the structure in a direction which is always substantially the same, i.e., within substantially the same limited confines of angle 1, for example. Such an approach is depicted in FIG. 2 which shows a combination of structures of the general type discussed with reference to FIGS. 1A and 1B. Such combination of structures has a first diffracting structure 27 having a diffraction grating surface 28 and a non-diffracting surface 29 with a liquid crystal material 41 in an intermediate region between surfaces 28 and 29 and a second diffracting structure 30 having a diffraction grating surface 31 and a non-diffracting surface 32 with a liquid crystal material 33 in an intermediate region between surfaces 32 and 31. The diffracting surface 31 of structure 30 and the non-diffracting surface 32 are each provided with conductive coatings 34 and 35, respectively. Conductive coatings 39 and 40 are provided on the surfaces 28 and 29, respectively, as shown.

Conductive coatings 34 and 39 are connected to the ground side of a source 20 voltage (+V) while coatings 35 and 40 are connected to the positive side of the voltage source 20 via switches 42 and 43, respectively. Switches 42 and 43 are suitably connected to the voltage source as depicted. The diffracting surface 28 has its dimensions and profile configured so as to respond to incident radiation from a general direction shown by arrows 44 over a range of incidence angles $\alpha_1$, while the diffracting surface 31 has its dimensions and profile configured so as to respond to incoming radiation from a general direction shown by arrows 46 over a range of incident angles $\alpha_2$.

When switch 42 is closed (switch 43 is open) and liquid crystal material 33 becomes aligned, incoming radiation over the incident angle range $\alpha_2$ is redirected in the general direction shown by arrows 45 as discussed above with reference to FIG. 1. The diffracting surface 28 has substantially little or no effect on the incoming radiation and in effect responds much as would plain glass material, the incoming radiation being transmitted therethrough with little or no change in direction.

When switch 43 is closed (switch 42 is open) and liquid crystal material 41 becomes aligned, incoming radiation over the incidence angle range $\alpha_1$ from the general direction of arrows 44 is redirected also in the general direction shown by arrows 45. In this case the diffracting surface 31 has little or no effect on such incoming radiation and transmits the re-directed radiation therethrough with little or no further change in direction.

Thus, incident radiation over a relatively larger range of incident angles $(\alpha_1+\alpha_2)$ is transmitted through the overall structure in such a manner that any such incident radiation is redirected in substantially the same direction, as depicted by arrows 45, within the relatively limited confines of exit angle $\theta_1$. Such an arrangement thereby permits the overall structure to respond to a much wider range of incident angles than in previously described structures without effectively increasing the range of exit angles. In doing so, the overall arrangement acts in the nature of a tracking device which effectively can be made to track the direction of the incoming radiation. Such tracking operation avoids the use of mechanically moving parts often used in tracking devices by using the concept of activating the desired liquid crystal materials electrically.

The structures discussed above and particularly that of the combination shown in FIG. 2 can be adapted for use, for example, as a window structure for responding to incoming sunlight and for directing such sunlight to a specified region in the interior of a room. Such a structure is shown diagrammatically in FIG. 4 wherein a room enclosure 50 has a window structure 51 placed at an exterior surface 52 thereof, of the type discussed above with reference to FIG. 2. Incoming sunlight over a relatively wide range of incident angles, depicted by angle $\alpha_3=(\alpha_1+\alpha_2)$, is redirected toward a relatively confined region at the surface region 53 at or near the ceiling of the room enclosure, i.e., within the range of exit angles $\theta_1$, as shown. Incoming sunlight from whatever angle of incidence over the range $\alpha_3$ is always directed toward the relatively limited confines of region 53. If highly reflective or diffusive reflective (i.e., white) material is placed at such region, for example, then the incoming sunlight can be utilized effectively in the room enclosure as desired.

Since the range of incident angles of the sun's rays changes from season to season one diffracting structure of the overall window structure can be arranged to respond to the range of incident angles expected during one season, e.g., when the sun is relatively high above the horizon (for example, within the range of angles $\alpha_2$ of FIG. 2), another diffracting structure can be arranged to respond to incident angles expected during another season, e.g., when the sun is relatively low above the horizon (for example, within the range of angles $\alpha_1$ of FIG. 2). During each particular season a different diffracting structure of the window is activated so as to provide the appropriate response for that particular season and the interior of the room can be assured of effective use of sunlight no matter what the angle of incidence above the horizon. While the structure is shown as responding to incident radiation in elevation in FIG. 4, the structure can also be arranged as described in the aforesaid Gerritsen et al. application to respond to incident angles in azimuthal directions also.

Figure 3:
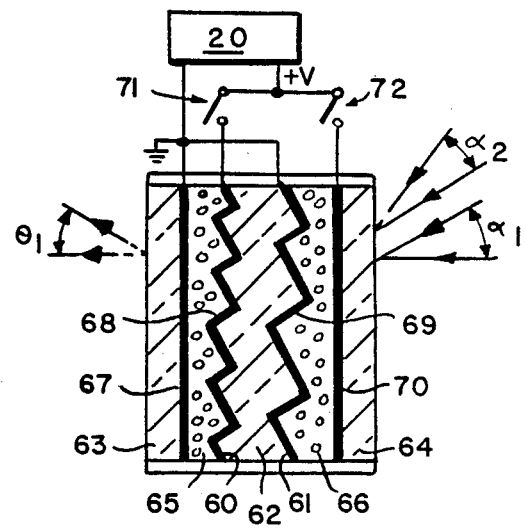
FIG. 3 shows an alternative embodiment using a plurality of structures as in FIG. 2.

An alternative embodiment of the overall structure of FIG. 2 is shown in FIG. 3 wherein diffracting surfaces 60 and 61 are found on opposite surfaces of an element 62. Elements 63 and 64 having non-diffracting surfaces are positioned opposite the diffracting surfaces 60 and 61, respectively. Liquid crystal materials 65 and 66 are contained in the respective intermediate regions formed therebetween. Conductive coatings 67, 68, 69 and 70 are provided and are connected to voltage source 20 and to switches 71 and 72 in the same manner as shown in FIG. 2. The structure of FIG. 3 operates substantially as discussed with respect to that of FIG. 2 where one of the switches 71 or 72 is appropriately activated at any one time to place an electric field across the associated liquid crystal materials 65 or 66, respectively.

While the arrangements depicted in FIGS. 2 and 3 show two pairs of diffraction grating surface/liquid crystal structures in a stacked configuration, a larger number of pairs thereof can be further stacked to extend the range of incident angles to which the overall arrangement responds.

The above techniques are generally useful using the structures depicted such as to provide the desired operation generally over a reasonable expected range of polarization of the incoming incident rays, although the efficiency of operation may be lower than desired in some applications since the problem of a wide range of polarizations is not taken into account. It is helpful to consider further variations in such structures which can tend to improve the overall efficiency of operation by taking into account the effect of the structure on incoming light having different polarizations.

Figure 5A:
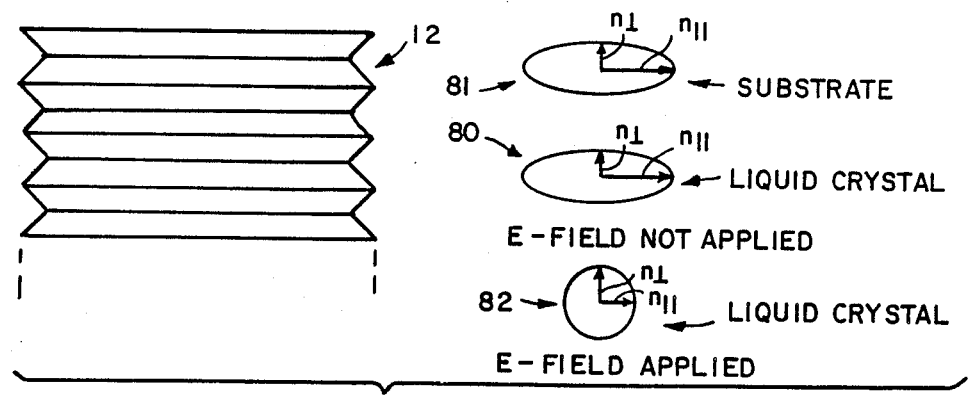
FIGS. 5A and 5B show diagrammatic representations which are helpful in explaining the operation of structures of the invention which can be used to take into account incident radiation of different polarizations.
Figure 5B:
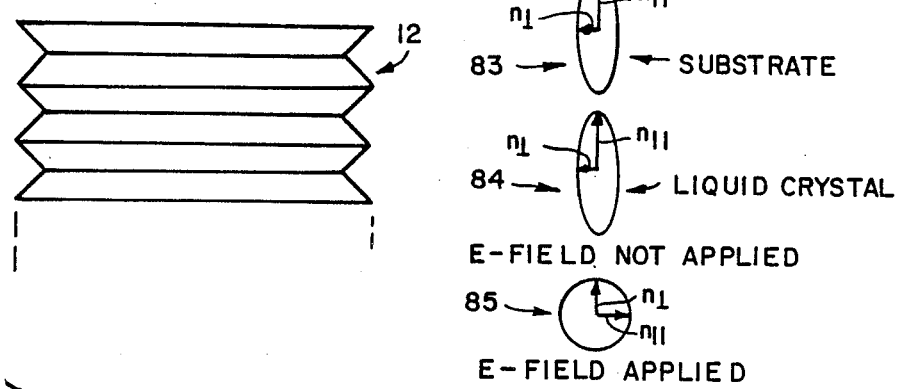

Such variations can be explained with the help of FIGS. 5A and 5B. FIG. 5A, for example, depicts diagrammatically the diffracting surface 12 of FIG. 1A looking from a direction perpendicular thereto (in effect showing in the plane of the drawing the plane of the interface of the diffracting surface 12 and the liquid crystal material 19). The diffraction gratings on the surface 12 are aligned horizontally in the plane as shown. The refractive indices, $n_{11}$ and $n_l$, of the liquid crystal in its inactivated state (when the voltage $+V$ is not applied, i.e., the electric field $E=0$) along the long axes of the crystals in such plane are depicted at 80 and are arranged to be aligned with the corresponding refractive indices $n_{11}$ and $n_l$ of the substrate material, as depicted at 81. The refractive indices of the substrate and the liquid crystal materials perpendicular to the surface (not shown) are also aligned. When the voltage V is applied, as in FIG. 1A, the resulting electric field causes the liquid crystal material to rotate so that the long axes of the crystals are perpendicular to the plane of the diffraction surface and the refractive indices in the plane of the diffraction surfaces are as shown at 82. While the refractive indices in the substrate and the liquid crystals in one direction (i.e., the vertical direction as depicted) are still matched, those in the other direction (i.e., the horizontal direction as depicted) are not. Accordingly, incident radiation polarized in the horizontal direction is diffracted in the desired direction while radiation polarized in the vertical direction is not.

If it is desired to diffract radiation in the vertical direction, a second diffracting structure can be used in which the substrate and liquid crystal refractive indices $n_{11}$ and $n_l$ in the plane of the diffraction surface are arranged in an inactivated state as shown at 83 and 84 of FIG. 5B. When the electric field is applied, the crystals are rotated so that their long axes are perpendicular to such surface and the refractive indices thereof in the plane are as shown at 85. In such case a mismatch occurs in the vertical direction and incident radiation polarized in such direction is appropriately diffracted as desired, while radiation polarized in the horizontal direction where the refractive indices are matched is not. Thus the use of a combination of structures diagrammatically depicted by FIGS. 5A and 5B provides the desired diffraction of incident radiation for any polarization direction (polarized radiation in any direction can be broken down into components in the horizontal and vertical directions).

Figure 7:
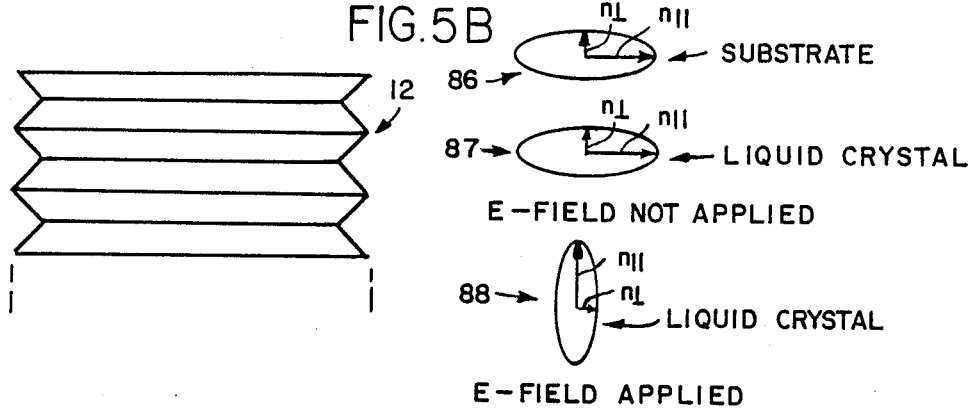
FIG. 7 shows a diagrammatic representation which is helpful in explaining the operation of the structure of FIG. 6.

As shown diagrammatically in FIG. 7, an alternative embodiment can be used in which the refractive indices $n_{11}$ and $n_l$ of the substrate and the liquid crystal material are aligned in the inactivated state in the interface plane thereof as depicted at 86 and 87, respectively. If the voltage is applied to the liquid crystals in the plane, i.e., to produce an electric field in a vertical direction along the plane rather than in a direction perpendicular to the plane as in FIG. 1A, the liquid crystals will rotate 90° in the direction of the electric field as depicted at 88. In such case the refractive indices of the substrate and the liquid crystal material are mismatched in both the vertical and horizontal directions so that diffraction occurs for incident radiation polarized in both such directions. Accordingly, a single diffraction structure can be used instead of the combination of structures discussed with reference to FIGS. 5A and 5B.

Figure 6:
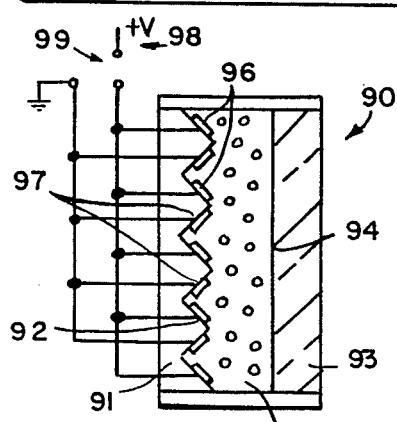
FIG. 6 shows an alternative embodiment of the invention for taking into account incident radiation of different polarizations.

Such a structure is shown in FIG. 6 which shows diffracting structure 90 having a first substrate 91 with a diffraction grating surface 92 as shown, a second substrate 93 with a non-diffracting surface 94, and a liquid crystal material 95 in the interface region therebetween. The liquid crystals in such material are generally arranged so that their long axes tend to align themselves in an inactivated state in the interface plane of the diffraction grating and the liquid crystal material in a direction parallel to the grating elements (i.e., horizontally) as discussed above with reference to FIG. 7.

The material of substrate 91 is selected so as to have the same anisotropic characteristics as the liquid crystal material so that it has corresponding refractive indices which are aligned with those of the liquid crystal material. The substrate material may be, for example, mica or a stretched cellophane.

When the refractive indices are thus aligned, those of the liquid crystal material effectively match those of the diffracting substrate and no diffraction effects occur so that incident incoming radiant energy is transmitted therethrough with its direction substantially unchanged, as discussed above.

When the liquid crystal material is activated by applying an electric field $+V$ across it in the interface plane (i.e., to produce an electric field vertically therein), the liquid crystals rotate so that their long axes rotate by 90° in the interface plane. Accordingly, a mismatch occurs in the interface plane) and diffraction occurs for incident energy polarized in both directions in the interface plane, as discussed above.

In order to produce such rotation the electric field must be quite strong and a relatively high voltage would have to be used. The supplying of such a high voltage may not be feasible in a practical structure from a single voltage source. Accordingly, it is preferable in such a case to use a distributed voltage source for such purposes. Such a distributed voltage can be obtained by treating the diffraction surfaces as a plurality of distributed interdigital electrodes in the interface plane. As shown in FIG. 6, electrically conductive material can be used to provide electrodes 96 along the lengths of first parallel surfaces in one direction while similar electrodes 97 can be provided along the lengths of second parallel surfaces in the other direction. Electrodes 96 can be connected together and in turn connected to one side of a voltage source 98 via a switch 99. Electrodes 97 can be connected together and in turn connected to the grounded side of voltage source 98. Such a structure can be physically realized, for example, by extending one set of electrodes beyond one end of the structure and extending the other set of electrodes beyond the opposite end of the structure. The extensions of each set can be connected together by conductive strips which are in turn connected to the voltage source as discussed above. The voltage from source 98 in this case can be much smaller than would be required if the distributed electrode approach were not used.

Figure 8:
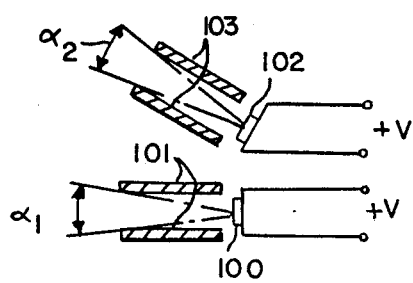
FIG. 8 shows an embodiment for sensing the direction of incident radiation for use with the structures of the invention.

An unique technique for supplying the voltage in the embodiments discussed above via a novel switching arrangement is shown diagrammatically in FIG. 8. As seen therein photovoltaic cells which produce a voltage output in response to an optical radiation input can be used. Thus a first such cell 100 is arranged by the use of appropriate elements 101, such as louvres, to be responsive primarily only to incoming radiation over a first range of incident angles, e.g., $\alpha_1$. So long as such radiation is received within such range voltage is provided at the output of photovoltaic cell 100. A second photovoltaic cell 102 is similarly arranged by the use of appropriate louvres 103 to respond only to incident radiation over a second range of incident angles, e.g., $\alpha_2$. The outputs of cells 100 and 102 are connected to the conductive coatings, e.g., coatings 39 and 40 and coatings 34 and 35, respectively, of FIG. 2. In this manner voltage is supplied to diffraction structure 27 for incident radiation over the angular range $\alpha_1$ and to diffraction structure 30 for incident radiation over the angular range $\alpha_2$.

Figure 4:
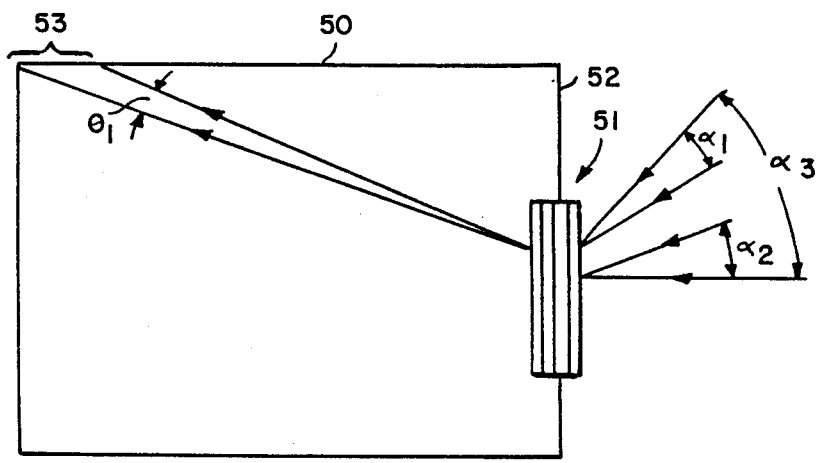
FIG. 4 shows in diagrammatic form the use of the invention as a window structure.

While the concept of the structure of the invention can find effective use in the room enclosure environment discussed with reference to FIG. 4 it is clear that such structure can also be used in other contexts as discussed in the previously filed Gerritsen et al. application. For example, in solar energy conversion systems which use arrays of parallel-connected photo-voltaic cells responsive to solar radiation for producing electrical energy, it is desirable that the solar radiation be directed toward such arrays throughout the daylight hours independent of the angle of incidence thereof. A structure of the type discussed above can be used to achieve such purpose wherein solar energy radiation is accepted over an enhanced range of incident angles by a three-dimensional diffraction grating structure which directs radiation toward the arrays of photo-voltaic energy conversion cells which are placed on a suitable substrate for producing a substantially continuous supply of electrical energy throughout the day.

Furthermore such a structure can be readily adapted for use with arrays of photo-voltaic cells comprising different materials each optimized in efficiency for a selected range of wavelengths. The color diffraction characteristics of the structure can then be used to advantage so that different kinds of color (i.e., different ranges of wavelengths) can be redirected to different types of photo-voltaic cells which respond to the appropriate colors involved.

In effect all of the uses of the structure of the previously filed Gerritsen et al. application can also be arranged to adapt the structure of this invention for substantially the same purpose. Accordingly, the disclosure of the previous application is incorporated herein by reference so as to complete this disclosure.

Further modifications of the invention within the spirit and scope thereof may occur to those in the art. Hence the invention is not to be construed as limited except as defined by the appended claims.

What is claimed is:

1. A device for responding to incoming radiation incident thereon within a given range of incidence angles and for redirecting said incoming radiation from said device in a selected direction within relatively confined limits, said device comprising a plurality of elements having diffracting surfaces and non-diffracting surfaces, said elements being arranged so that a plurality of pairs of diffracting and non-diffracting surfaces are oppositely disposed from one another and form a plurality of intermediate regions;

a liquid crystal material positioned in each of said plurality of intermediate regions;

activation means for placing all of the liquid crystal material in any one of said intermediate regions in an activated state at any one time, the liquid crystal material in the others of said intermediate regions at such time being in an inactivated state;

whereby incoming radiation incident on said device within a specified portion of said given range of incidence angles is transmitted through said device and exits therefrom in said selected direction.

2. A device in accordance with claim 1 wherein, when a liquid crystal material is in an inactivated state, said incoming radiation is transmitted through the portion of said structure containing said material and exits therefrom in a direction which is substantially unchanged from its incident direction thereon.

3. A device in accordance with claim 1 wherein said activation means includes means for applying an electric field to said liquid crystal material so as to cause said liquid crystal material to be aligned with said electric field in said activated state.

4. A device in accordance with claim 3 wherein said electric field applying means includes a plurality of electrically conductive elements in contact with said diffracting and non-diffracting surfaces;

a source of voltage;

switching means connected to said conductive elements and to said voltage source for applying said voltage across selected ones of said conductive elements to place the liquid crystal material therebetween in its activated state.

5. A device in accordance with claim 1 wherein the liquid crystal materials in different ones of said plurality of intermediate regions are activated at different times so that incoming radiation incident on said device within different portions of said given range of incidence angles corresponding to said different ones of said intermediate regions is transmitted through said device and exits therefrom in said selected direction.

6. A device in accordance with claim 1 wherein two intermediate regions are formed and said incoming radiation over a first range of incidence angles is redirected through said device in said selected direction at one time and incoming radiation over a second range of incidence angles different from said first range thereof is redirected through said device in said selected direction at another time.

7. A device in accordance with claim 1 wherein said plurality of elements comprises a first diffraction structure having a first diffracting surface;

a second diffraction structure having a second diffracting surface;

first and second liquid crystal materials positioned in contact with the diffracting surfaces of said first and second diffraction structures, respectively;

means for placing the liquid crystal material in contact with said first diffraction structure in an activated state at one time whereby incoming radiation incident on said device within a first portion of said given range of incidence angles is transmitted through said device and exits therefrom in said selected direction and for placing the liquid crystal material in contact with said second diffraction structure in an activated state at another time whereby incoming radiation incident on said device within a second portion of said given range of incidence angles is transmitted through said device and exits therefrom in said selected direction.

8. A room enclosure having a window region in which a device in accordance with claims 1 or 7 is mounted so as to permit sunlight radiation to be incident thereon, whereby incoming sunlight radiation incident on said device over a given range of incidence angles is transmitted through said device and exits therefrom into the interior of said room enclosure in a selected direction so as to impinge upon a selected surface region of the interior of said room enclosure.

9. A device in accordance with claim 1 wherein said liquid crystal material is a nematic liquid crystal material.

10. A structure in accordance with claim 1 wherein the the diffracting and non-diffracting surfaces and the liquid crystal materials in the intermediate regions form interface planes, the refractive indices $n_{11}$ and $n_1$ in said interface planes of said nematic liquid crystal materials are such that the difference $(n_{11}-n_1)$ between said indices is greater than about 0.10.

11. A device in accordance with claim 10 wherein said difference is equal to or greater than about 0.20.

12. A device in accordance with claim 11 wherein said nematic liquid crystal material is BHH-E7.

13. A device in accordance with claim 3 wherein said electric field is applied in a direction which is substantially perpendicular to the plane of a diffracting surface adjacent said liquid crystal material.

14. A device in accordance with claim 3 wherein said electric field is applied in a direction which is substantially parallel to the plane of a diffracting surface adjacent said liquid crystal material.

15. A device in accordance with claim 14 wherein said electric field applying means includes plurality of first electrodes in contact with a first plurality of parallel surfaces of said diffracting surface and with the liquid crystal material in contact with said parallel surfaces, said first electrodes being electrically connected together;

a plurality of second electrodes in contact with a second plurality of parallel surfaces of said diffracting surface and with the liquid crystal material in contact with said parallel surfaces, said second electrodes being oppositely disposed with reference to said first electrodes and being electrically connected together;

a source of voltage;

switching means connected to said voltage source and to said first and second electrodes for applying a plurality of distributed voltages across selected ones of said first and second electrodes to place the liquid crystal material in contact therewith in its activated state.

16. A device in accordance with claim 1 wherein said activation means includes a plurality of activation means responsive to incoming radiation over said different portions of said given range of incidence angles, each of said activation means being effectively responsive to said radiation at said different times over different ones of said different portions of said given range.

17. A device in accordance with claim 16 wherein each said activation means includes louvre means and associated photovoltaic means, each said louvre means being arranged to permit incoming radiation within a different selected portion of said given range thereof to be directed to said associated photovoltaic means, said photovoltaic means responding to said radiation to activate said liquid crystal material.

* * * * *